Patented Apr. 13, 1943

2,316,201

UNITED STATES PATENT OFFICE 2,316,201

METHOD OF RECOVERING ELEMENTAL SULPHUR FROM GASES CONTAINING SULPHURETED HYDROGEN, CARBON OXYSULPHIDE, AND CARBON DISULPHIDE

Sven Johan Walldén and Ruth Saga Mariana Sundgren-Walldén, née Sundgren, Stockholm, Sweden, assignors to Imperial Chemical Industries Limited, Millbank, London, England, a limited joint-stock company of Great Britain No Drawing. Application December 10, 1938, Serial No. 245,034. In Sweden December 10, 1937

6 Claims. (Cl. 23—226)

The present invention relates to a new method of producing sulphur from gases containing one or more of the compounds sulphureted hydrogen, carbon oxysulphide and carbon disulphide, characterised in the main thereby that these gases are mixed with sulphurous acid, or sulphurous acid containing gases, and conducted at a temperature below 350° C. over a catalyst containing alkali compounds.

In roasting, smelting or other metallurgical treatment of ores containing sulphuriferous minerals there are obtained gases containing large quantities of sulphur dioxide. These must as a rule not be discharge or emitted into the open air, because they may cause serious damage or injury to vegetation and animal life in the surrounding districts. There are several methods of recovering sulphur in some form from such gases. In order to recover sulphur in an element form the sulphur dioxide must as a rule be reduced by means of carbon or carbonaceous gases or material at a high temperature, and the reaction completed within the gas mixture formed in suitable catalysing chamber. In this reduction process there is, however, as a rule by reason of the steam and hydrogen present also developed sulphureted hydrogen. Minor quantities of carbon oxysulphide and carbon disulphide also generally occur. These sulphuriferous compounds in the exhaust gases entail low yields of elemental sulphur in the reduction process and involve a risk of damage or injury in the surroundings. It is, therefore, of the utmost importance in such processes to recover in some way the sulphur from sulphureted hydrogen or other sulphuriferous compounds as formed. This can be done in such a way that the velocity of the gas in the reduction process is so regulated that a sufficient quantity of sulphur dioxide is left in the issuing gas for a secondary reaction with developed sulphureted hydrogen, carbon oxysulphide and carbon disulphide.

One must, especially if the gases contain large quantities of steam and elemental sulphur, carry out the said secondary reactions between remaining sulphur dioxide and sulphureted hydrogen, carbon oxysulphide and carbon disulphide as formed, at a low temperature, preferably lower than 350° C., in order that particularly the state of equilibrium of the reaction of sulphureted hydrogen shall be favourable. At such a temperature the rapidity of reaction is, however, very low, for which reason catalysts must be employed if one wishes to carry out a technically practicable process. Several catalysts for the reactions in question are known, inter alia bauxite. The catalysts hitherto used are, however, technically unsuitable, generally because the reaction velocities in spite of their aid are insufficient and sometimes because the catalyst effect is gradually destroyed through the conversion of the active substances.

The inventors have now succeeded in producing some catalyst combinations which are many times more effective than those hitherto used, so that a technically advantageous process can be based upon them.

The essential component in these combinations is always alkali or alkali compounds, preferably such as give an alkaline reaction in an aqueous solution, e. g. $Na_2O$, $Na_2S$ and $Na_2CO_3$. It is previously known that additions of alkali compounds to the reducing agent in the reduction of gases containing $SO_2$ by means of solid carbonaceous substances exercise a very favourable action upon the process, in that the working temperature of the reaction chamber could be lowered and the velocity of the gas considerably increased. The alkali compounds volatilize to some extent and produce a catalytically active coating on the contact substance. By this means the reaction between dioxide of sulphur and carbon monoxide as well as carbon oxysulphide is accelerated, but also the reactions between sulphur, sulphur dioxide and carbon oxysulphide on the one hand and steam on the other, which give sulphureted hydrogen are accelerated. Upon the subsequent cooling of the gas, there is from a view point of equilibrium a possibility for sulphureted hydrogen to react with sulphur dioxide to yield sulphur, but there is then no longer any alkali left in the gas.

It has, therefore, been found necessary after cooling of the gas to a temperature below 350° C. again to bring the same into contact with alkalis or alkali compounds in a highly active condition or in a highly active mixture. One can then convert practically the entire content of suphureted hydrogen, carbon oxysulphide and carbon disulphide of the gas, with sulphur dioxide, into elemental sulphur.

The alkali compounds are converted, upon being thus treated with the sulphurous gas at a low temperature, partly into alkali sulphide, alkali thiosulphate, etc., and remain in a catalytically highly active form, provided the gas does not contain any large quantities of oxygen. If such were the case, the catalytically less active sulphate of sodium would be formed. The gases derived from the reaction process are, however, free from oxygen.

Alkali compounds may at a higher temperature be used as catalysts alone, but then they should be applied to a porous foundation with the largest possible surface, e. g. brick or pumice stone. It is still better to apply them to, or mix them in, a porous mass containing compounds which contain water of crystallisation or hydration, and are of such a nature that at the reaction temperature in question they retain some combined water. Substances of such a nature exercise a powerfully absorbent action on $H_2S$ and other gases, for which reason a combination of, for example concrete and gypsum and alkali compounds, makes excellent catalysts. The effectiveness is enhanced on account of the fact that the anhydrides of the hydrates themselves are catalysts, e. g. oxide of iron and zinc oxide.

One can also make good catalysts by a combination of alkali compounds with other compounds, e. g. iron and zinc compounds. These may be applied such as by painting (i. e., coating) them on, or by mixing them with, substances containing water of hydration.

The catalysts may become gradually coated with an inactive dust originating from impurities in the gas. The alkali catalysts possess the very great advantage that one can activate the dust-covered surface by rinsing with aqueous solutions of the salts.

The present invention may, of course, be used for making innocuous, or neutralizing, sulphureted hydrogen developed from other processes than the aforesaid. Industrial exhaust gases frequently contain considerable quantities of sulphureted hydrogen which must be disposed of at any price. For this purpose, it is desirable to mix the gas containing sulphureted hydrogen with a gas containing sulphur dioxide and conduct it through a catalysing chamber according to this invention. The necessary sulphur dioxide may be obtained such as by the combustion of some of the sulphureted hydrogen content of the exhaust gases. By this invention it is made possible to purify gases containing sulphureted hydrogen even when present in very low concentration.

Having thus described our invention we declare that what we claim is:

1. In a process for producing elemental sulphur in the gaseous state from a gas containing hydrogen sulphide as at least a major sulphur-containing constituent thereof, the step of passing said gas in admixture with sulphur dioxide in contact with a catalyst at a temperature below 350° C., the gaseous reaction mixture being substantially free of oxygen and substantially free of added carbonaceous reducing material; said catalyst comprising a water-soluble compound of an alkali metal, which compound is capable of forming an alkaline aqueous solution.

2. In a process for producing elemental sulphur from a gas containing hydrogen sulphide in relatively low concentration, said hydrogen sulphide constituting at least a major sulphur-containing constituent thereof, the step of passing said gas in admixture with sulphur dioxide in contact with a catalyst at a temperature below 350° C., the gaseous reaction mixture being substantially free of oxygen and substantially free of added carbonaceous reducing material, and containing sufficient sulphur dioxide to convert said hydrogen sulphide to elemental sulphur; said catalyst comprising a water-soluble compound of an alkali metal, which compound is capable of forming an alkaline aqueous solution.

3. The process of claim 1 in which the catalyst is selected from the class consisting of $Na_2O$, $Na_2S$ and $Na_2CO_3$.

4. The process of claim 1 in which the catalyst is supported on a carrier having a large surface relative to its volume.

5. The process of claim 1 in which the catalyst also comprises at least one additional substance containing water of crystallization which is not completely lost at the temperature of reaction.

6. The method of claim 1 in which the passage of said gas admixed with sulphur dioxide is interrupted, the catalyst activated by washing with an aqueous solution of an alkali metal compound, and said gas in admixture with sulphur dioxide is again passed in contact with said catalyst at said temperature.

SVEN JOHAN WALLDÉN.
RUTH SAGA MARIANA SUNDGREN-WALLDÉN, NÉE SUNDGREN.

CERTIFICATE OF CORRECTION.

Patent No. 2,316,201.          April 13, 1943.

SVEN JOHAN WALLDEN, ET AL.

It is hereby certified that the above numbered patent was erroneously issued to "Imperial Chemical Industries Limited" whereas said patent should have been issued to --Imperial Chemical Industries Limited, of Millbank, London, England, a limited joint-stock company of Great Britain, and Bolidens Gruvaktiebolag, Stockholm, Sweden, a limited joint-stock company of Sweden, as shown by the record of assignments in this office; and that the said Letters Patent should be read with this correction therein that the same may conform to the record of the case in the Patent Office.

Signed and sealed this 8th day of June, A. D. 1943.

Henry Van Arsdale,
Acting Commissioner of Patents.

(Seal)